United States Patent [19]

Vansandt

[11] Patent Number: 5,131,289
[45] Date of Patent: Jul. 21, 1992

[54] WEDGE PIECE FOR IMPROVED HAND GRIP

[76] Inventor: Steve A. Vansandt, 4572 Palmer Ave., Jacksonville, Fla. 32210

[21] Appl. No.: 758,415

[22] Filed: Sep. 4, 1991

Related U.S. Application Data

[63] Continuation-in-part of Ser. No. 504,870, Apr. 5, 1990, abandoned.

[51] Int. Cl.⁵ .............................................. B62K 21/12
[52] U.S. Cl. ................................. 74/551.8; 74/551.1
[58] Field of Search ....................... 74/551.5, 551.8; 228/261-264, 270, 274; 188/24.11, 24.22, 2 D; 5/424

[56] References Cited

U.S. PATENT DOCUMENTS

| | | | |
|---|---|---|---|
| 1,486,638 | 3/1924 | Crofoot | 74/558.5 |
| 4,523,745 | 6/1985 | Killman et al. | 5/424 |
| 4,750,754 | 6/1988 | Lennon | 74/551.8 |
| 4,930,798 | 6/1930 | Yamazaki et al. | 74/551.8 |

FOREIGN PATENT DOCUMENTS

| | | | |
|---|---|---|---|
| 0335610 | 10/1989 | European Pat. Off. | 74/551.8 |
| 1006743 | 4/1957 | Fed. Rep. of Germany | 74/551.8 |
| 2549796 | 2/1985 | France | 74/551.8 |
| 1919 | of 1896 | United Kingdom | 74/551.8 |
| 1389679 | 4/1975 | United Kingdom | 74/551.8 |

*Primary Examiner*—Vinh T. Luong
*Attorney, Agent, or Firm*—John P. Halvonik

[57] ABSTRACT

An improved gripping piece for use on the handlebar portions of ten speed bicycles and other dropped bar steering devices. The improvement comprising a arcuate-shaped gripping piece that can be taped or otherwise attached to existing handlebars at the position where the handlebar is curved. The arcuate-shaped piece provides a more comfortable gripping surface for the palm of the rider and eliminates discomfort caused by the long term gripping of the handlebars in a position that is unnatural to the usual position of the palm.

8 Claims, 1 Drawing Sheet

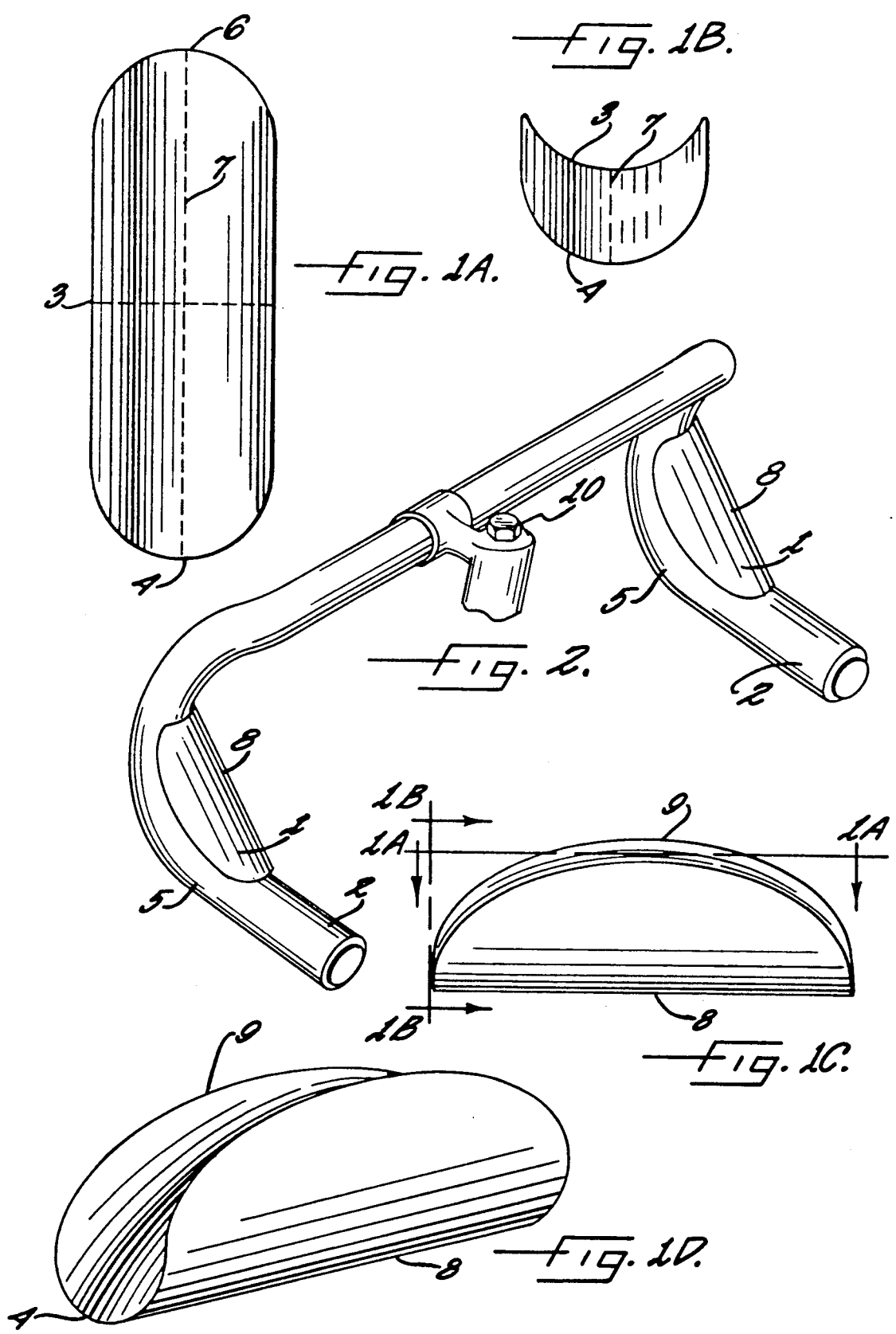

WEDGE PIECE FOR IMPROVED HAND GRIP

This is a continuation-in-part application of Ser. No. 07/504,870 filed on Apr. 4, 1990 now abandoned.

BACKGROUND OF THE INVENTION

1. Field of the Invention

The invention relates to the field of bicycle handgrips and, in particular, to those handlebars that are curved downward for the rider to grip. These are usually known as "racing style" handle bars. The invention provides an improved handgrip shape in the form of a wedge that can be taped or otherwise fitted onto existing bicycle grips.

2. Description of the Prior Art

There are various shaped bicycle and motorcycle handles designed to promote a less painful grip, see eg. U.S. Pat. No. 4,522,483 to Morgan. Unlike the patent to Morgan, where the grip is near the end of the bar, the device of the present invention is placed where the bars curve downward near the typical position of the handbrake. This is necessary to alleviate the pain caused by the continuous gripping of the handlebars at the area most accesible to the handbrakes.

SUMMARY OF THE INVENTION

The invention relates to an attachment piece for a bicycle handlebar of the kind that are commonly found on ten-speed bicycles. The piece can be retrofitted onto existing bicycle handlebars by tape or other means. It is placed at that point where the handlebars curve and the rider's palms usually grip the bars. The invention eliminates the pain and discomfort caused by holding the handlebars in a position that is unnatural to the shape of the palm.

It is the object of this invention to provide a device for improving the shape of reverse curve handlebars that can be fitted onto bicycle handlebars.

Another object is to provide an improved handgrip that changes the usual hand grip from a shape that is uncomfortable to the palm to a shape that conforms more nearly to the palm.

It is the object of this invention to provide a handgrip on a vehicle that will not cause the hand of the rider to become numb (fall asleep) as it is gripped.

Yet another object of the invention is to provide a handgrip that will support the entire length of the palm as it grips the handlebars.

Yet another object is to provide a handgrip that supports comfortably the palm in a position that is close to the handbrake.

Still another object is to provide a handgrip that will result in the safe and comfortable controlling of a vehicle.

Other advantages will be obvious from a reading of the specifications of the invention.

BRIEF DESCRIPTION OF THE DRAWINGS

FIG. 1A top view of the gripping pieces showing the trough

FIG. 1B side view of the gripping piece

FIG. 1C lengthwise view of the piece

FIG. 1D three quarter view of the piece

FIG. 2 illustrates the position on the handle bars where the grip is placed.

DESCRIPTION OF THE PREFERRED EMBODIMENT

One of the most uncomfortable experiences to anyone who has ridden a ten-speed bike for a long time is the soreness and sometimes numbing (falling asleep) of the hands that is caused by the gripping of handle bars. Typically, racing style handlebars on a ten speed are gripped on that portion of the bars that are curved downward. This curved downward portion is known as the "dropped portion." After a long period of gripping, the palm of the rider becomes numb and weak. Most likely, what is happening is that the arms in that position are far extended with nearly the entire weight of the rider being brought to bear on the narrow area where the palm meets the bar.

The present invention alleviates some of the strain on the palm by interposing between the bar and the hand which causes the palm to be retracted so that the angle the palm makes with the bar is greater and the strain is directed downward toward the more fleshy portions of the palm which are better able to bear the brunt of the weight. Also, with the grip the palms have more of a surface in which to clench the bar. Without the grip piece, the fists are clenched tightly around the bar, causing unnecessary strain due to the tight and constricted fist.

The device is typically made of a hard rubber or plastic and is of a shape that resembles an orange slice that has a trough running through the upper surface 9 of the slice (see FIG. 1A). The shape can be more nearly described as that of an arcuate shape having a trough with center line 7 running the length of the top side of the gripping piece. That side of the piece having the trough is known as the upper surface and is attached to the downwardly curved portions of standard 10-speed racing bicycles.

As seen in FIG. 1B, the trough has a C shape which runs the length of the upper side. The center line of the trough does not run straight across but rather curves upward to match the curve of the upper side edges 9 of the piece so that the bottom of the trough is at it highest near the midline 3 of the trough as seen in FIG. 1B. The trough descends to the level of the front and back edges 4, 6 of the bottom surface in much the same way that a saddle is shaped. Indeed, the shape of the piece may be described as that of a saddle.

The upper side edges 9 match the curve of the handle bars of the bike the bottom surface 4 is somewhat convex as seen in FIG. 1B. In cross-section, the trough can be seen as concave.

FIG. 2 shows the position of the grip on the bar. The handlebars 2, start at the center 10 of the bike and fan straight out to the left and right. At a certain distance from the center, the bars begin to curve downward and back toward the rider. This is the position 5 where the gripping piece 1 is placed, on the inward side of the bars, i.e.: that side of the bars that are facing the rider.

This area 5 is the closest position to the handbrakes where a grip can be placed. With the trough section in place alongside the handle bars, the bottom surface 8 of the piece faces the palms of the rider as he grips the handlebars, The handbrakes are generally on the downturned portions of the bars, on the opposite side of the bar from the gripping piece. The grip can be taped in place on the handlebars of the standard ten-speed bicycle. The tape on the handlebars is removed and the arcuate-shaped piece is placed at the curved point of the bars and then re-taped in place.

One advantage to this grip over others is that the grip extends across the width of the palm as the bars are gripped. This serves as adequate support for the palm for long rides.

The gripping member can be made of any long lasting material that will serve as a strong grip. Hard plastic or rubber is preferred but other softer materials are useful also, these of course, would provide for a more cushioned impact.

I claim:

1. An improved bicycle handle bar gripping piece for attachment to the curved downward portions of the handle bars of standard 10-speed racing bicycles, said piece having a top surface with front and back end and a bottom surface, said top surface having a trough running the length of said surface from front to back end, said trough having a U-shaped cross-section with center line at the bottom of said U shape, said upper surface having side edges parallel to said trough and curved outward, so that said trough is capable of fitting against the curved downward portions of said handlebars, said center line parallel to said upper side edges and curved upward with a high point at about the mid point of the center line.

2. The apparatus of claim 1 being made of plastic material.

3. The apparatus of claim 2 being made of rubber material.

4. The apparatus of claim 2 where said bottom surface is of convex shape.

5. The apparatus of claim 3 where said bottom surface is of convex shape.

6. A combination handlebar and a gripping piece in connection with said handlebar for improving the gripping of said handlebars comprising: handlebar having straight center section and left and right dropped portions, said dropped portions extending downward below the plane of said center section in a C shape, said downward portions having gripping piece, said said piece having a top surface with front and back end and a bottom surface, said top surface having a trough running the length of said surface from front to back end, said trough having a U-shaped cross-section with center line at the bottom of said U shape, said upper surface having side edges parallel to said trough and curved outward, so that said trough is capable of fitting against the curved downward portions of said handlebars, said center line parallel to said upper side edges and curved upward with a high point at about the mid point of the center line.

7. The combination of claim 6 wherein said gripping member is plastic.

8. The combination of claim 6 wherein said gripping member is rubber.

* * * * *